United States Patent
Fiss et al.

(10) Patent No.: US 6,329,006 B1
(45) Date of Patent: Dec. 11, 2001

(54) ONE-SITE FRUIT PROCESSING AND PACKAGING FACILITY

(76) Inventors: Herbert W. Fiss, 6906 18th Ave. W., Bradenton, FL (US) 34209; W. H. Sayce, Ping Ching, Cuckmere Road, Seaford, East Sussex (GB)

(*) Notice: Subject to any disclaimer, the term of this patent is extended or adjusted under 35 U.S.C. 154(b) by 0 days.

(21) Appl. No.: 09/484,546

(22) Filed: Jan. 18, 2000

(51) Int. Cl.[7] .............................. B65B 55/12; A23L 2/02
(52) U.S. Cl. ..................... 426/399; 426/400; 426/599; 426/489; 426/388; 426/521; 99/483; 99/495; 53/440
(58) Field of Search .................................. 426/399, 400, 426/599, 330.5, 129, 392, 521, 489, 386, 387, 388; 99/483, 495, 538; 53/425, 440, 167, 172

(56) References Cited

U.S. PATENT DOCUMENTS

| | | |
|---|---|---|
| 2,320,036 * | 5/1943 | Harris . |
| 2,847,310 * | 8/1958 | Turnbow . |
| 4,534,991 * | 8/1985 | Kryger .................................. 426/592 |
| 4,978,549 * | 12/1990 | Takada et al. ........................ 426/489 |
| 5,292,543 * | 3/1994 | Heath et al. ......................... 426/506 |
| 5,614,238 * | 3/1997 | Mendez ................................ 426/397 |
| 5,955,132 * | 9/1999 | Spica et al. ........................... 426/399 |

FOREIGN PATENT DOCUMENTS 62-065669 * 3/1987 (JP) .

* cited by examiner

Primary Examiner—Milton I. Cano
Assistant Examiner—Robert Madsen
(74) Attorney, Agent, or Firm—Charles J. Prescott

(57) ABSTRACT

A one-site fruit processing and packaging facility and method of processing, packaging, and shipping blended fruit juices and fruit juice concentrates. A single extended enclosure is provided within which the facility equipment and associated functions are housed. The facility further includes, preferably in seriatim, a fruit shipment receiving area for receiving fruit shipments, fruit crushing equipment for crushing the fruit into a fruit mash, a juice extraction station for extracting juice from said fruit mash by preheating, enzyme treating and depectizing juices from the fruit mash, juice pasteurizing and aroma essence stripping to produce aseptic juice, microfiltration of the aseptic juice received from the pasteurizing station, and an evaporative juice concentration stage to remove excess water from aseptic juice into a concentrated juice. A portion of concentrated aseptic juice is typically then placed into bulk shipment containers ready for shipment. A remaining portion of concentrated aseptic juice is blended with separate fruit juice concentrates separately received and stored in the facility for producing a desired blended juice with high uniformity and consistency. A portion of blended juice is sterilized and maintained at a preselected cold-ambient fill temperature while another portion of the blended juice is sterilized and maintained at preselected temperature. Each blended juice is then packaged into predetermined self-stable containers ready for shipment.

3 Claims, 1 Drawing Sheet

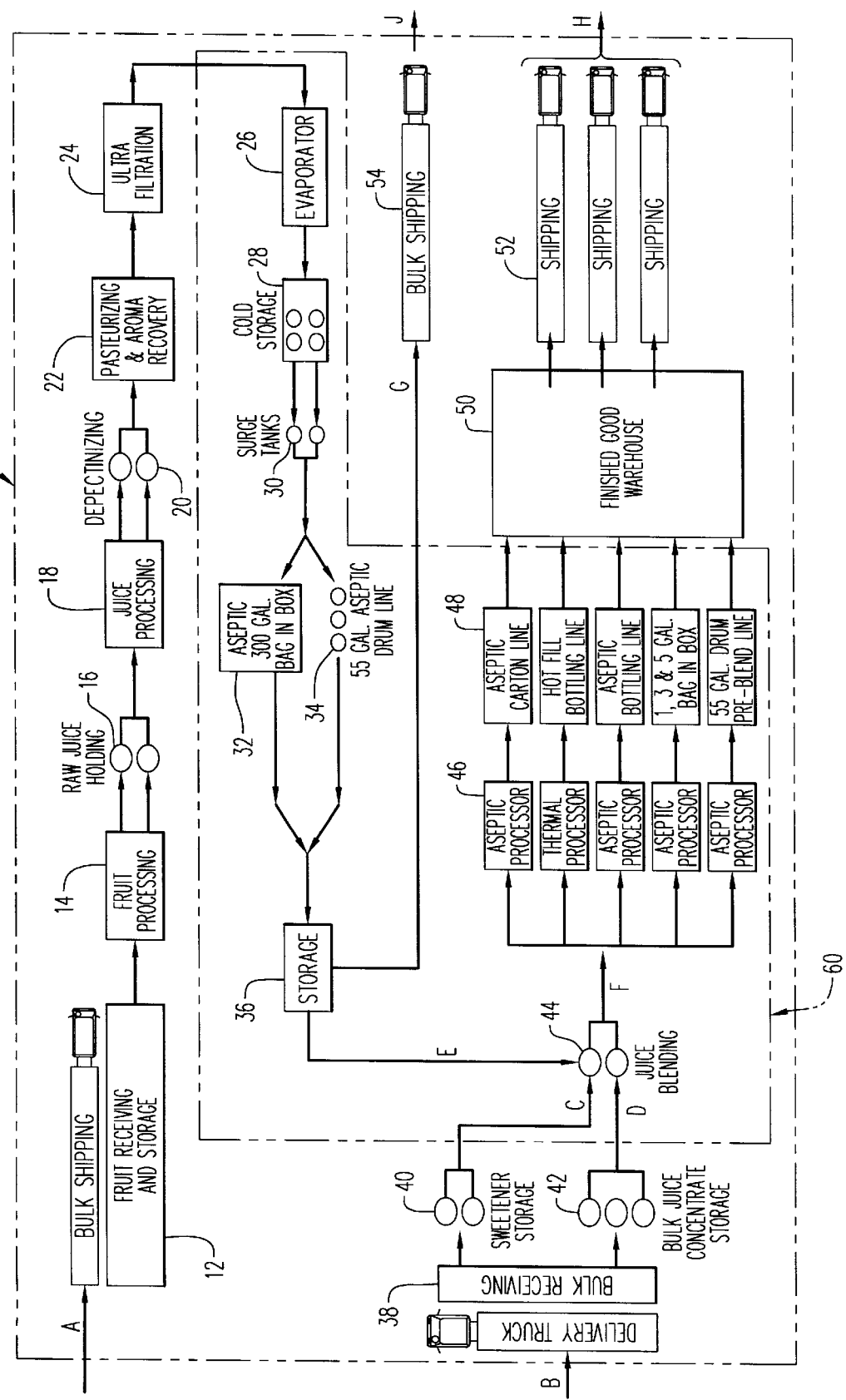

ONE-SITE FRUIT PROCESSING AND PACKAGING FACILITY

BACKGROUND OF THE INVENTION

1. Scope of Invention

This invention relates generally to the processing of fruit into fruit juice, and more particularly to a one-site facility within which substantially all of the equipment and steps of fruit processing are housed.

2. Prior Art

The industry and technology of processing fruit into concentrates and blended juices includes well-known individual steps and equipment for accomplishing each of the stages or steps in the fruit processing chain of events. Moreover, the fruit processing industry has evolved into having only portions of the entire process being accomplished at a single location.

That is to say that one entity may harvest the fruit and deliver same to another facility which accomplishes a portion of the overall steps toward the shipment of a concentrate or the packaging and shipment of preselected blended juices. Typically, after the fruit has been partially processed, it is shipped to yet another location for further processing, purification, filtration, containerizing the partially processed fruit juice for shipment to a final destination which may then accomplish the blending and final packaging for consumer consumption.

Armed with substantial experience and expertise, applicant's are unaware of any prior art facility or processing in this industry which is substantially self-sufficient in that all of the steps of fruit handling from receiving the raw fruit to the packaging and shipment of juice concentrates and blended juices for direct human consumption are completed therein.

One of the features of the present invention is that it provides an automatic control production chain from receiving fruit shipments to packaging all concentrates and blends at a single location and within one plant facility structure. The present invention also enables a manufacturer to produce final fruit juice products under a complete and controlled aseptic environment which begins at the point where the fruit juice itself is filtered in preparation for evaporation and continuing until the final packaging of either the concentrate or the blended fruit juices is accomplished.

By providing a single plant facility, selected and quality controlled juice concentrates and blended fruit juices may be dealt with commercially based upon a single all inclusive purchase order from customers of juice products produced within the present invention. Additionally, the present invention offers a substantially wider range of final juice products for distribution such as fruit juice concentrates either packed in bulk or for consumer use, blended juices, both concentrated and ready for consumption, along with single strength fruit juices packaged in a wide variety of commercial containers. All this is accomplished automatically within the one-site facility of the present invention to satisfy the broadest range of purchase order variety and at considerably less expense and in the shortest and quickest deliver times yet seen in this industry.

BRIEF SUMMARY OF THE INVENTION

This invention is directed to a one-site fruit processing and packaging facility and method of processing, packaging, and shipping blended fruit juices and fruit juice concentrates. A single extended enclosure is provided within which the facility equipment and associated functions are housed. The facility further includes, preferably in seriatim, a fruit shipment receiving area for receiving fruit shipments, fruit crushing equipment for crushing the fruit into a fruit mash, a juice extraction station for extracting juice from said fruit mash by preheating, enzyme treating and depectizing juices from the fruit mash, juice pasteurizing and aroma essence stripping to produce aseptic juice, microfiltration of the aseptic juice received from the pasteurizing station, and an evaporative juice concentration stage to remove excess water from aseptic juice into a concentrated juice. A portion of concentrated aseptic juice is typically then placed into bulk shipment containers ready for shipment. A remaining portion of concentrated aseptic juice is blended with separate fruit juice concentrates separately received and stored in the facility for producing a desired blended juice with high uniformity and consistency. A portion of blended juice is sterilized and maintained at a preselected cold-ambient fill temperature while another portion of the blended juice is sterilized and maintained at preselected temperature. Each blended juice is then packaged into predetermined self-stable containers ready for shipment.

It is therefore objects of the present invention to provide a one purchase order "one stop shop" plant facility offering the following customer benefits:

1. Controlled fruit juice and concentrate product quality;
2. Monitoring of product quality at every stage of fruit juice concentrate and in blended form to insure maximum quality and consistency of product;
3. Maintaining customer product to a consistently exact quality standard desired by each customer, as well as consistently meeting the standards of USDA, and the USF&DA;
4. More competitive product pricing as a result of minimizing the negative effects of multiple sources of supplies, channels and handling by middle men, agents and brokers through which product ingredients and final product have traditionally flowed;
5. Providing a wide range of product packaging configurations such as preblends and mixed blends of fruit juice concentrates in various sized containers, fruit juice concentrates packed aseptically in containers suitable for the food service industry, aseptically packed fruit juices in P.E.T. bottles for both private and brand label consumer retail sales, and other forms of juice preparation and packaging as are well known in the retail consumer industry.

It is another object of this invention to provide a wide variety of consistent and accurately blended fruit juices which are blended with fruit juice obtained from both locally grown sources and from world-wide grown sources of fruit to eliminate the seasonal effect of quality variation in both juice concentrates and juice blends.

It is still another object of this invention to provide an improved method of processing fruit into fruit juice concentrates, fruit juices and fruit juice blends of high quality and consistency, in a broad range of varieties and packagings all from a single site plant facility.

In accordance with these and other objects which will become apparent hereinafter, the instant invention will now be described with reference to the accompanying drawings.

BRIEF DESCRIPTION OF THE DRAWINGS

FIG. 1 is a schematic view of the one-site plant facility of the present invention showing both equipment and the preferred seriatim flow of events therethrough.

DETAILED DESCRIPTION OF THE INVENTION

Referring now to FIG. 1, the invention is shown generally at numeral 10 within the phantom boundary intended to represent a single site facility and enclosure. Raw fruit obtained from local sources is received into the facility 10 at a fruit receiving and storage station 12 in the direction of arrow A. This station 12 is intended to receive delivery trucks and to offload the fresh-picked fruit. In automated fashion, the fresh-picked fruit is then moved along into a fruit processing station 14 within which the fruit is finely crushed into a gelatinous mass and stored within the raw juice holding tanks 16.

Thereafter, the fruit mash is automatically forwarded to a juice processing station 18 wherein fruit juice is extracted from the fruit mash by preheating and enzyme treating, followed by depectizing the fruit juices at 20. The fruit juice is then automatically moved into a pasteurizing and aroma stripping or recovery station 22 from which aseptic juice is forwarded for ultrafiltration at station 24.

The fruit juice is thereafter concentrated by an evaporation process at 26 followed by cold storage of the concentrated juice at 28. Surge tanks 30 are utilized to meter the cooled concentrated fruit juice into either aseptic containers of the juices at 32 or 34 for internal storage and processing or for bulk fruit concentrate shipment. Stored juices from storage area 36 are moved automatically in the direction of arrow E into a juice blending station 44 or may be loaded directly into bulk unblended concentrate shipping containers 54.

Separately in the facility 10, delivery trucks deliver bulk juice concentrate at 42 and liquid sweetener 40 from a bulk juice receiving station 38 in the direction of arrow B. These bulk juice concentrates and liquid sweeteners at 42 and 40, respectively, are metered into the juice blending station 44 in the direction of arrows D and C, respectively, to be combined with juice concentrate so that the final blended juice exits therefrom in the direction of arrow F.

A predetermined variety of simultaneous aseptic and thermal processor stations 46 each receive the blended juice. Each processor station 46, operating independently and simultaneously one to another as programmed, receives the blended fruit juice and either prepares it for thermal hot fill or for a septic "cold ambient fill" which next occurs at the appropriate carton bottling, bagging or drumming lines 48, after which the now packaged or containerized blended fruit juices are forwarded to a finished goods warehouse 50. Shipment of the self-stable packaged or containerized blended fruit juices is accomplished at the shipping stations 52 in the direction of arrow H.

As previously described, bulk shipment of juice concentrates from the storage area 36 are accomplished directly per customer order separately from the more refined fruit juice blending stages thereafter by a separate bulk shipping station 54 in the direction of arrow J from the facility 10.

It is preferred to provide an aseptic environment 60 within the facility 10 which encompasses the evaporation station 26 through the containerizing and bottling lines 48.

It is important to note that little detailed attention has been given to the individual stations and equipment contained within the facility 10 as that equipment and detailed function of each is well known. That is to say that, although state-of-the-art equipment is intended to be incorporated into each such facility 10, any newness or novelty associated with each piece of equipment or each station is otherwise well known in the art.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A one-site fruit processing and fruit juice packaging facility comprising:
   a single extended building enclosure comprising in seriatim:
      a fruit receiving station for receiving fruit shipments;
      a fruit crushing station for finely crushing fruit received from said fruit shipment receiving station to produce a fruit mash;
      a juice extraction station for extracting juice from the fruit mash by preheating, enzyme treating and depectizing juices from the fruit mash;
      a juice pasteurizing station for pasteurizing and aroma essence stripping of juice received from said juice extraction station;
      a juice filtration station for microfiltration of juice received from said juice pasteurizing station;
      an evaporator station for removing excess water from juice received from said juice filtration station;
      a bulk packaging station for placing a first portion of concentrated unblended juice received from said evaporator station into bulk shipment containers ready for shipment and for placing a second portion of the concentrated unblended juice into storage containers;
      a juice blending station for combining concentrated unblended juice from said storage containers with one or more separate fruit juice concentrates and additives to produce a desired blended juice;
      a plurality of independent blended juice processors including an aseptic processor for insuring that a portion of blended juice received from said juice blending station is sterilized and maintained at a preselected cold-ambient fill temperature and a thermal processor acting independently of and simultaneously with said aseptic processor for insuring that another portion blended juice received from said juice blending station is sterilized and maintained at a preselected elevated temperature;
      a plurality of independent aseptic blended juice packaging stations each acting independently and simultaneously of one another and receiving aseptic blended juice from one of said processors for packaging or containerizing the corresponding aseptic blended juice into predetermined self-stable containers ready for shipment;
      said evaporation station, said bulk packaging station, said juice blending station, said blended juice processors, and said blended juice packaging stations being within an aseptic environment.

2. A method of processing and packaging fruit at a single-site plant facility comprising the steps of:
   A. receiving fruit shipments into said facility;
   B. crushing the fruit to produce a fruit mash;
   C. extracting juice from said fruit mash by preheating, enzyme treating and depectizing said fruit mash;
   D. pasteurizing and aroma essence stripping said juice to produce aseptic juice;
   E. microfiltrating said aseptic juice;

F. concentrating said aseptic juice by evaporating excess water from said aseptic juice;

G. placing a portion of concentrated aseptic juice into bulk shipment containers ready for shipment;

H. blending a remaining portion of concentrated aseptic juice with one or more other separate fruit juice concentrates and additives to produce a desired blended juice;

I. providing a plurality of independent substantially simultaneously acting processors to treat the blended juice, said plurality of processors including an aseptic processor and a thermal processor;

J. aseptically treating a portion of the blended juice at a preselected cold-ambient fill temperature within said aseptic processor;

K. independently and substantially thermally sterilizing another portion of the blended juice at a preselected elevated temperature within said thermal processor;

L. providing a plurality of independent substantially simultaneously acting blended juice packaging stations;

M. packaging aseptic blended juice at said stations from each of said aseptic and thermal processors into predetermined self-stable containers ready for shipment;

steps F to M being carried out in an aseptic environment.

3. A fruit processing and packaging facility comprising:

a single extended building enclosure;

a fruit receiving station of said enclosure for receiving raw fruit shipments;

a fruit crushing station within said enclosure and in proximity to said fruit receiving station for finely crushing fruit received from said fruit receiving station to produce a fruit mash;

a juice extraction station within said enclosure for extracting juice from the fruit mash by preheating, enzyme treating and depectizing juices from said fruit mash received from said fruit crushing station;

a juice pasteurizing station within said enclosure for pasteurizing and aroma essence stripping of juice received from said juice extraction station;

a juice filtration station within said enclosure for microfiltration of juice received from said juice pasteurizing station;

a juice concentrating station within said enclosure for evaporating excess water from aseptic juice received from said juice filtration station;

a bulk juice packaging station within said enclosure for placing a portion of concentrated aseptic juice received from said juice concentrating station into bulk shipment containers ready for shipment from a bulk shipping station of said enclosure in proximity to said bulk packaging station;

a juice blending station within said enclosure for blending concentrated aseptic juice received from said juice concentration station with one or more other separate fruit juice concentrates and additives to produce a desired blended juice;

one or more aseptic processors within said enclosure for sterilizing and maintaining blended juice received from said juice blending station at a preselected cold-ambient fill temperature;

one or more thermal processors acting independently and simultaneously with said aseptic processor within said enclosure for sterilizing and maintaining blended juice received from said juice blending station at a preselected elevated temperature;

a plurality of blended juice packaging stations within said enclosure each acting independently and simultaneously of one another and separately receiving blended juice from each of said processors and packaging blended juice into predetermined self-stable containers ready for shipment from a finished goods shipping station of said enclosure in proximity to said packaging stations;

said juice concentrating station, said bulk packaging station, said juice blending station, said processors, and said packaging station being within an aseptic environment.

* * * * *